United States Patent
Barksdale, Jr. Gordon G. et al.

[11] Patent Number: 5,231,610
[45] Date of Patent: Jul. 27, 1993

[54] PILING AND PIER INSPECTION APPARATUS AND METHOD

[76] Inventors: Barksdale, Jr. Gordon G., 15838 Roxton Ridge, Webster, Tex. 78214; Herman J. Schellstede, 342 Duperier Ave., New Iberia, La. 70560

[21] Appl. No.: 919,743

[22] Filed: Jul. 27, 1992

[51] Int. Cl.$^5$ .............................................. G01S 15/00
[52] U.S. Cl. ..................................... 367/99; 367/105; 367/138; 367/908; 367/910
[58] Field of Search .................. 367/99, 105, 106, 908, 367/138, 910; 73/290 V; 340/621

[56] References Cited

U.S. PATENT DOCUMENTS

| | | | |
|---|---|---|---|
| 3,164,799 | 1/1965 | Minasian | 367/99 |
| 3,617,996 | 11/1971 | Herbert | 367/105 |
| 3,686,887 | 8/1972 | Bruce | 405/15 |
| 4,855,966 | 8/1989 | Cinquino | 367/99 |

FOREIGN PATENT DOCUMENTS 55-104707  8/1980  Japan .

OTHER PUBLICATIONS

The *MESOTECH* Brochure, published by Mesotech Systems, Ltd., 2830 Huntington Pl. Port Coquitlam, B.C., Canada V3C 4T3. (date of publication unknown).
The *MESOTECH* Brochure, published by Simrad Mesotech Systems Ltd., 2830 Huntington Place, Port Coquitlam, B.C., Canada V3C4T3. (date of publication unknown).
The *Klein Digital Sonar Systems* Brochure, published by Klein Associates, Inc. High Resolution Sonar, Klein Drive, Salem, N.H. 03079. (date of publication unknown).
The *Oceonics I* Brochure, published by Endeco/YSI, Inc., 13 Atlantis Drive Marion, Mass. (date of publication unknown).
The *SIMRAD MS 990 Series Color Imaging Sonars* Brochure, published by Simrad Mesotech Systems, Ltd., 1598 Kebet Way, Port Coquitlam, B.C., Canada. (date of publication unknown).
The *CAP-6000A Chirp Acoustic Profiler* Brochure, published by Datasonics, P.O. Box 3, Cataumet, Mass. 02534. (date of publication unknown).
The *High Definition Sonar* Brochure, published by Submar, Inc., 5200 Mitchelldale B-17, Houston, Tex. 77092. (date of publication unknown).
The *Standard Mesotech Model 971 Colour Imaging Sonar System Operating Manual*, pp. 4–18 published by Mesotech Systems, Ltd., 2830 Huntington Pt., Post Coquitlam, B.C., Canada V3C 4T3. (date of publication unknown).

*Primary Examiner*—Daniel T. Pihulic
*Attorney, Agent, or Firm*—Mason, Fenwick & Lawrence

[57] ABSTRACT

The objects of the present invention are achieved by temporarily suspending sonar beam transducer means at a first underwater location within sonar beam range of said scoured area; scanning a first portion of said scoured area with said sonar beam in a first substantially vertical plane that points in a first azimuth direction, so as to generate signals indicative of the range and bearing of said scanned first portion from said transducer means; and scanning at least a second different portion of said scoured area with said sonar beam in a second different substantially vertical plane that points in a second different azimuth direction, so as to generate signals indicative of the range and bearing of said scanned second portion from said transducer means. In actual practice, scanning by the sonar beam occurs in many different vertical planes and also can be done from different underwater locations.

20 Claims, 9 Drawing Sheets

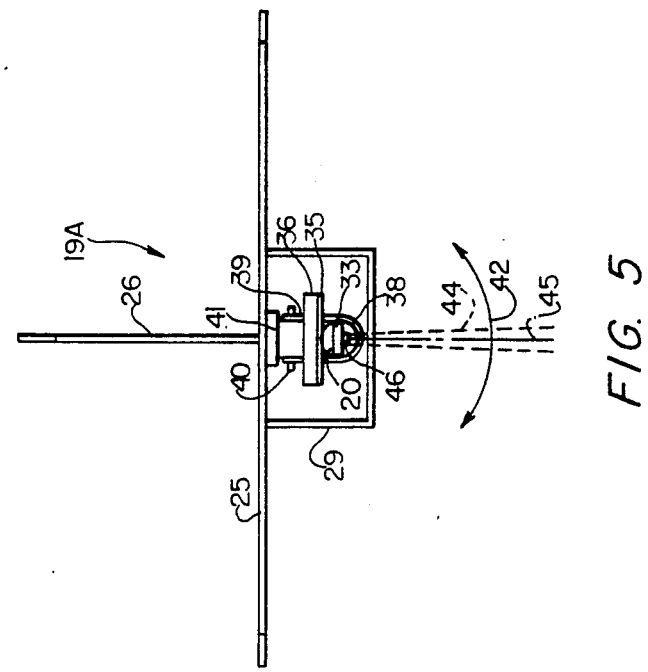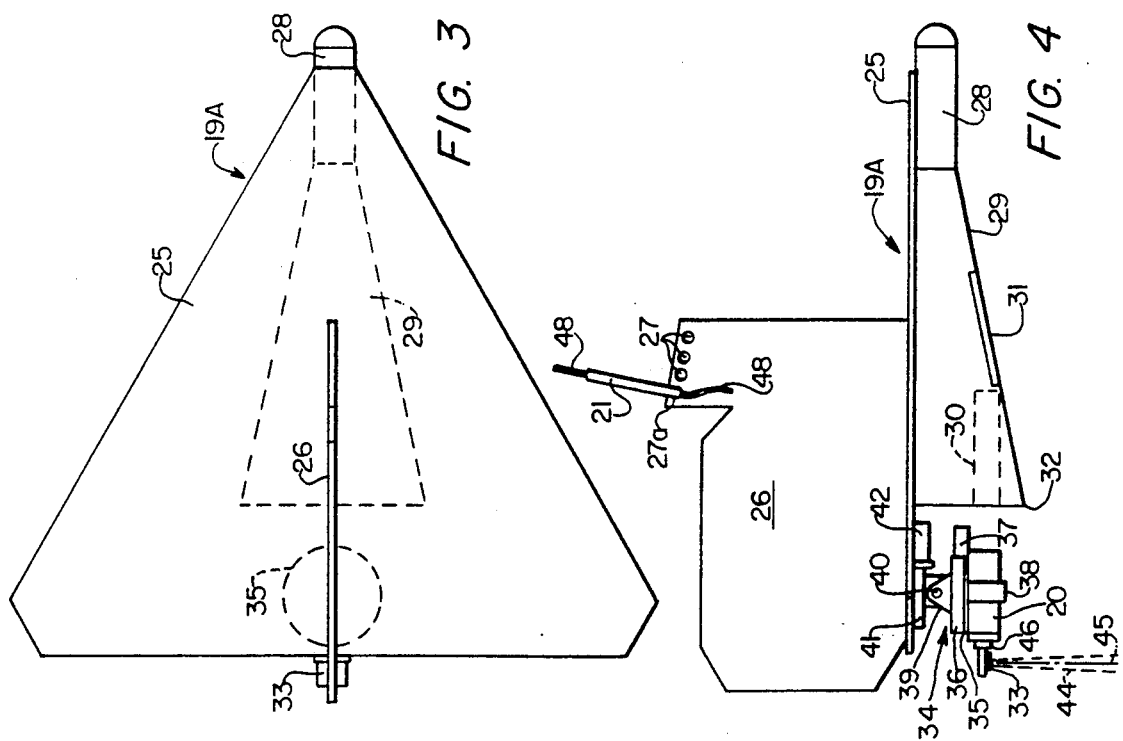

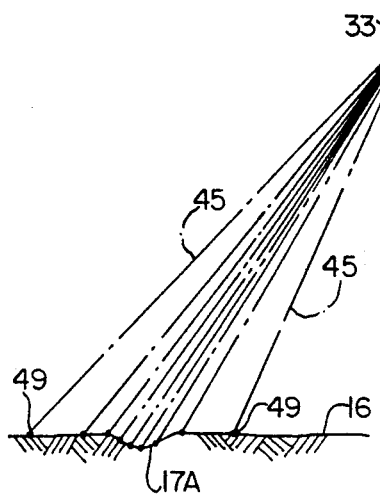
FIG. 8A
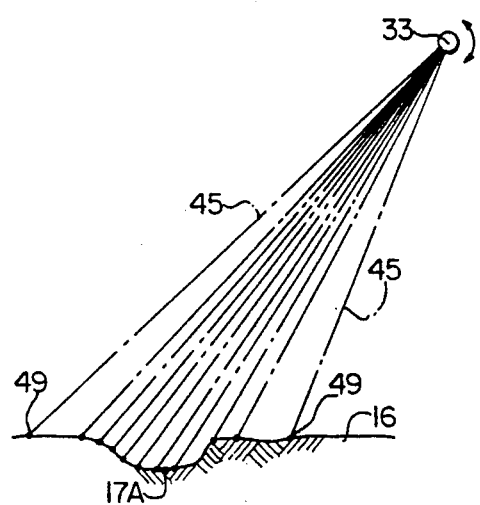
FIG. 8B
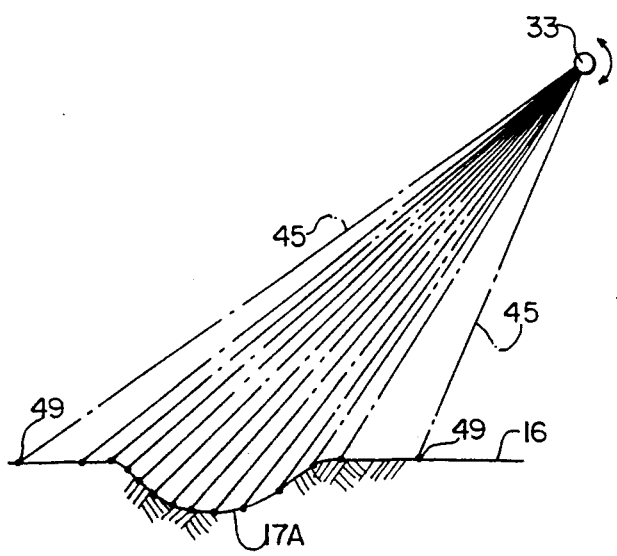
FIG. 8C
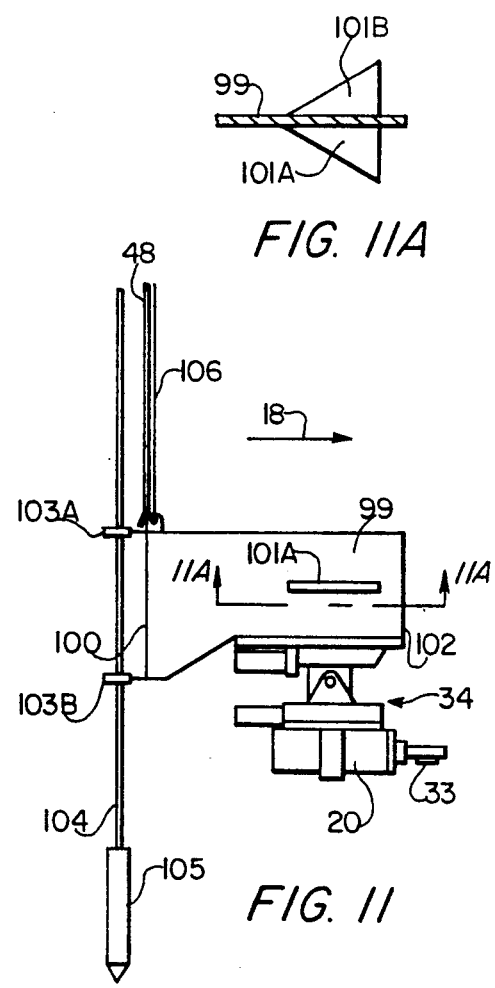
FIG. 11A
FIG. 11

PILING AND PIER INSPECTION APPARATUS AND METHOD

FIELD OF THE INVENTION

The present invention relates to a method and apparatus using sonar for determining the nature of one or more scoured underwater bottom areas adjacent to structures submerged in a current of water. The invention is particularly, but not exclusively, useful in safely determining the depth and extent of such scoured areas when the water is moving at a relatively high velocity during flood conditions.

BACKGROUND OF THE INVENTION

Present day bridge structures reflect technological advances in design and construction that have evolved over the years. However, these advances have not precluded unfortunate and, in some instances, tragic occurrences of bridge collapses resulting in the loss of life and property. Older bridges are even more prone to failure. These events have increased interest in the inspection and maintenance of bridges, prompting the U.S. Congress in 1968 to require the establishment of national bridge inspection standards (NBIS) and the development of a program to train bridge inspectors. In subsequent years, the government has continued to stress the importance of bridge inspection and has ordered steps to insure that each state has a well-founded underwater inspection program including scour investigations. Recent revisions to the NBIS now mandate that a master list be developed of all bridges which require underwater inspection, that procedures be determined for these underwater inspections, and that the frequency of inspection for each bridge (not to exceed 5 years) be determined.

Surveys indicate that there are hundreds of thousands of bridges in the continental United States which are over waterways of varying widths and depths. Nearly one hundred thousand of these bridges must be monitored for scour conditions once every two years or more often if water conditions, such as floods, dictate such inspection. A scour condition can arise when abnormally high or unusually fast flowing water in a stream or river bed causes soil to be temporarily or permanently removed from various places in the river bottom, thus creating bottom holes or depressions which may have substantial depth in relation to the average elevation of the river bottom at these places. Although loose silt and other water-born materials may sometimes fill in a scoured area after the flood waters recede, this fill material often is less dense or compacted than the previously undisturbed bottom soil and thus does not offer as much lateral resistance as did the original soil. If such scouring occurs around a supporting pier or footing of a bridge so as to significantly diminish the lateral restraining forces applied to the structure by the surrounding soil, the potential exists for a failure of the structure after several scouring events have occurred. Thus, scour inspection is extremely important for bridge safety.

The two most common methods of scour inspection are manned diving operations and small craft fathometer surveys. However, these methods are usually practical for safety reasons only when the water is flowing less than about 3 feet per second. On the other hand, the most severe scour conditions occur during flood stages where water can flow in excess of 15 feet per second, which is when scour inspection is most useful in order to provide accurate data about the true extent of soil removal. The reason for inspecting during flooding is that, as mentioned above, loose silt may later refill a scoured area around a bridge footing after the water subsides, which then may give a false impression of soil conditions to a diver or to mechanical means for measuring the elevation of the river bed around bridge footings during a calm period. The present invention, however, is designed to function in fast flowing flood waters without posing danger to the personnel operating this system.

SUMMARY OF THE PRESENT INVENTION

Accordingly, it is a primary object of the present invention to provide novel methods and apparatus for safely ascertaining by sonar how much scouring is taking place around bridges or similar structures when flood conditions prevail.

Another object of the present invention is to provide novel methods and apparatus for inspecting underwater scoured areas with sonar whereby no permanent installation of equipment is required.

A further object of the present invention is to provide novel methods and apparatus for quickly obtaining profile data about most, if not all, of an underwater area being scoured by high water velocity conditions.

These and other objects of the present invention are achieved by temporarily suspending sonar beam transducer means at a first underwater location within sonar beam range of said scoured area; scanning a first portion of said scoured area with said sonar beam in a first substantially vertical plane that points in a first azimuth direction, so as to generate signals indicative of the range and bearing of said scanned first portion from said transducer means; and scanning at least a second different portion of said scoured area with said sonar beam in a second different substantially vertical plane that points in a second different azimuth direction, so as to generate signals indicative of the range and bearing of said scanned second portion from said transducer means. In actual practice, scanning by the sonar beam occurs in many different vertical planes and also can be done from different underwater locations.

BRIEF DESCRIPTION OF THE DRAWINGS

FIGS. 3, 4, and 5 are plan, side elevation and rear elevation views, respectively, of a first preferred embodiment of underwater sonar inspection scour fish apparatus used in the present invention.

FIGS. 8A, 8B and 8C are diagrammatic elevation views taken along three of the vertical scanning planes illustrated in FIG. 7.

FIGS. 11 and 11A show another embodiment of the underwater sonar inspection apparatus, wherein the sonar head and its tilt-and-pan mechanism are mounted on a finned structure which slides along a rope attached to a bullet or clump weight.

DETAILED DESCRIPTION OF PREFERRED EMBODIMENT

Figure 1:
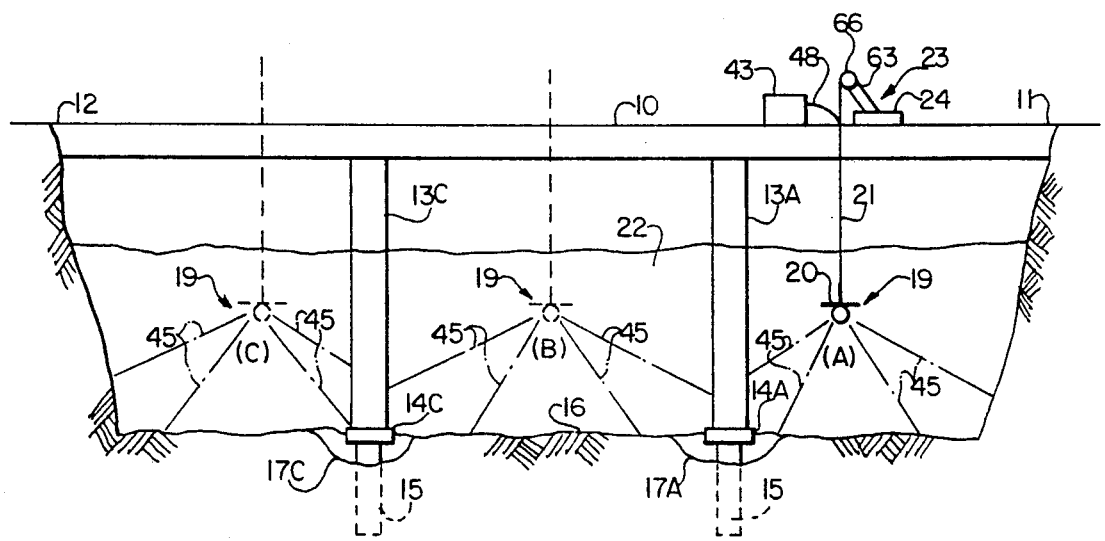
FIG. 1 is a diagrammatic elevation view of a bridge structure over a river bed which includes a simplified representation of the preferred inspection equipment used in the present invention.

In describing the preferred embodiments of the subject invention illustrated in the drawings, specific terminology is used for the sake of clarity. However, the invention is not intended to be limited to the specific terms so selected, and each specific term includes all technically equivalent terms for steps or devices operating in a similar manner to accomplish a similar purpose.

Figure 2:
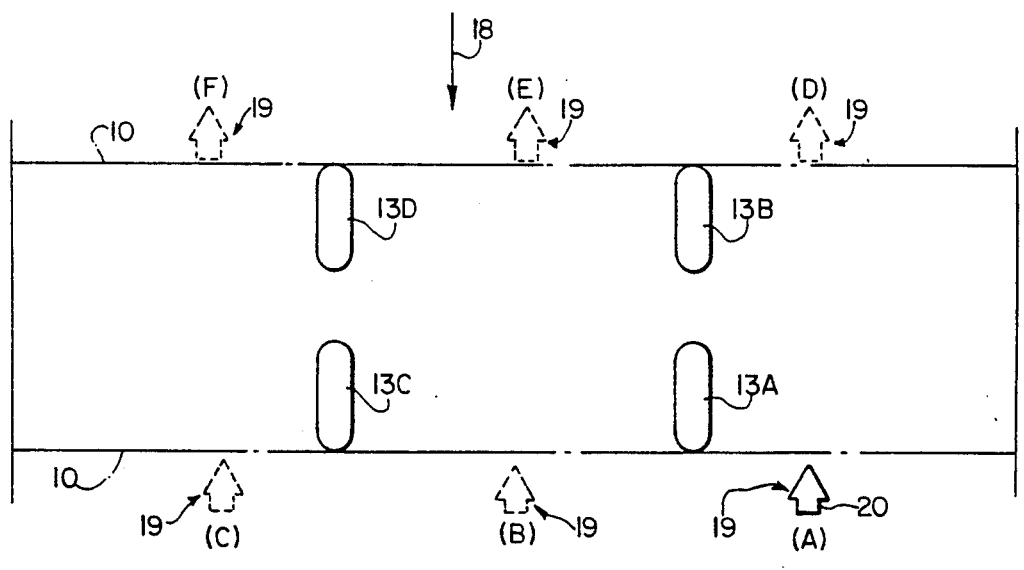
FIG. 2 is a diagrammatic plan view of the FIG. 1 equipment and bridge structure.

FIGS. 1 and 2 (not to scale) are diagrammatic elevation and plan views, respectively, of a bridge structure over a river. This bridge structure consists of a vehicle roadbed 10 supported at each end 11 and 12 by the embankments on each side of the river. The center part of the roadbed span is supported by two pairs of spaced-apart piers 13A-13B and 13C-13D, with the piers of each pair being positioned on opposite sides of the roadbed 10 a best shown in FIG. 2. Each of the piers 13A-13D is vertically disposed and rests upon a respective footing 14A-14D, which in turn is supported by several pilings 15 driven deep into the river bottom 16.

As is partially observable in FIG. 1 which shows the downstream side of the bridge, it is assumed that the underwater bottom areas 17A and 17C adjacent to the submerged footings 14 of the two downstream piers 13A and 13C are being scoured to a depth below the average elevation of the river bottom by virtue of a rapidly moving river current in the direction of arrow 18 during a flood condition. Similar scouring is also occurring around the footings 14 of the two upstream piers 13B and 13D. In order to determine the nature of such scoured areas, such as their depth and extent, the present invention includes the use of equipment next to be described.

As shown in solid lines to the right of pier 13A in FIG. 1, an underwater vehicle 19 (hereafter called a "scour fish" or "fish") carrying a sonar scanning head 20 is lowered from roadbed 10 by a support rope or cord 21 into the water 22 and temporarily suspended at an underwater location (A). Rope 21 may be fed out and controlled by a suitable crane 23, whose boom 63 with reeving pulley 66 (see FIGS. 17 and 18) is carried on a frame structure 24 that can be moved along roadbed 10 on either side. This underwater scour fish 19, which is only diagrammatically shown in FIGS. 1 and 2, can be either one of two different preferred embodiments such as are illustrated in FIGS. 3-5 or in FIGS. 9-10. The other dotted outlines of this fish 19, as shown in FIGS. 1 and 2, represent different underwater locations (B)-(F) to each of which the fish may be successively moved and temporarily suspended after it has finished scanning scoured areas from its solid line location (A) shown in FIGS. 1 and 2.

FIGS. 3, 4 and 5 are plan, side elevation and rear elevation views, respectively, of a first preferred scour fish embodiment 19A at whose stern is attached the sonar scanning head 20. This 19A embodiment comprises a body which includes a thin, flat laterally extending delta-shaped fixed wing structure 25 which is horizontally disposed and tapers inwardly toward the bow or front end of the fish. In practice, the fixed wing 25 can be about 48" wide from tip to tip. A thin vertical stabilizing fin 26 is connected to the rear half of the wing upper surface and along the wing's longitudinal center line. A series of holes 27 are formed in the fin 26 near its forward upper edge for attaching the supporting rope 21 to the fish at any one of several positions by means of a pin 27a or other connector, depending on the dive angle desired for the fish.

A generally cylindrical bow weight 28 is attached under the front end of wing 25 and to its lower surface for counter balancing the weight of the sonar head 20 and related equipment at the fish's stern. A shield 29 is also attached to the wing lower surface and behind the bow weight 28 for enclosing and protecting a current flow meter 30 used to measure the velocity of the swiftly moving river current at the fish's underwater level. This current velocity information can be important to the end user of the scour data when such data is being analyzed. Any suitable current flow meter may be used, such as a Type 174 axial flow meter available from Endeco/YSI, Inc. Shield 29 has a screened window or opening 31 in front of the flow meter 30 for permitting the river water to enter and activate the flow meter. This water exits through the open rear side of shield 29. The shield 29 is also tapered downwardly from front to back so that its lowest rear edge 32 extends below the sonar head 20 in order to protect this head and its related equipment from impact damage caused by debris or other objects carried by the river.

The stern-mounted sonar scanning head 20, with a rotating transducer 33 thereon, is connected to the rear lower surface of the wing 25 by means of a rotatable tilt and panning mechanism 34. This tilt and pan mechanism comprises (in part) a circular panning platform 35 which, in the FIG. 4 elevation view, is rotatable in a horizontal plane about a vertical axis by any suitable and conventional gear assembly that is mounted in a housing 36 and which is operably meshed with a gear on the shaft of an electrical panning motor 37 that is attached to the gear housing 36. The sonar head 20 is secured by a U-shaped clamp 38 or other suitable means to the undersurface of platform 35 so that the compass-pointing direction or azimuth of the scanning sonar head 20 can be changed by the rotation of the platform. The gear housing 36, in turn, is suspended from ears or lugs 39 whose upper ends are fixedly connected to the ends of a rotatable tilt shaft 40 that is horizontally disposed in the FIG. 4 and FIG. 5 elevation views. The tilt shaft 40 is contained in a tilt housing 41 secured to the delta wing lower surface at the fish's stern. An electrical tilt motor 42 is also mounted on the tilt housing 41 and has its motor shaft internally connected through any suitable and conventional gear mechanism in said housing 41 to the tilt shaft 40 for rotating this shaft in either a clockwise or a counter- clockwise direction. Motors 37 and 42 obviously must be waterproofed by conventional techniques, and the same is true for gear housings 36 and 41.

Figure 19:
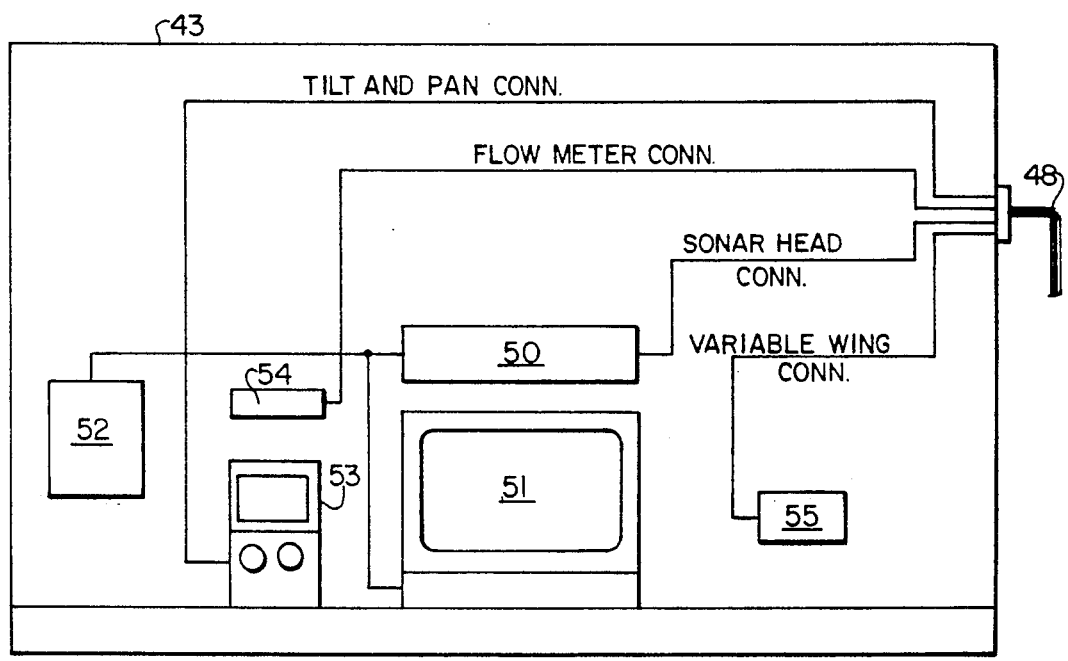
FIG. 19 is a diagrammtic representation of equipment in a remote surface station which is electrically connected to devices carried by the underwater sonar inspection apparatus.

Transducer 33 is attached to the rotating horizontal shaft 46 of the horizontal scanning sonar head 20, and this transducer generates a sonar beam that impinges upon objects or surfaces in its path which reflect and return acoustic echo signals to the transducer. Transducer 33 then converts these acoustic return signals to electrical signals which are processed by suitable sonar equipment in a remote portable control station 43 on top of the bridge roadbed 10, or elsewhere if desired. FIG. 19 diagrammatically shows this sonar and other equipment in station 43. The transducer 33 preferably generates a narrow angle conical sonar beam 44 having a center line 45 which is illustrated in both FIG. 4 and FIG. 5. Beam 44 projects at a right angle from a flat face of the transducer 33 which, as mentioned before, is mounted on the rotating shaft 46 of the sonar head 20. As shown in FIG. 5, as the sonar head shaft 46 and transducer 33 rotate, the conical beam 44 also rotates around the shaft 46 as illustrated by the arrow 47. The sonar head 20 may be programmed from the control station 43 to continuously rotate the transducer 360° around its axis 46, or head 20 may be programmed to cause the transducer to scan a sector less than 360 degrees if this is all that is required for the scour inspection operation.

Sonar equipment suitable for the practice of the present invention may be obtained from a variety of commercial sources. For example, the Mesotech Model 971 sonar system (made by Mesotech Systems of Port Coquitlam, Canada) is particularly useful in this regard. Thus, the function of sonar head 20 in FIGS. 3-5 may be performed by the Mesotech Model 971-1 rotary scanning head, while the transducer 33 shown in FIGS. 3-5 may consist of the Mesotech Option 3 rotary scanning transducer which can generate either an imaging fan beam or a profiling cone beam. The Mesotech sonar cone beam is 1.7° in angular width and has a range up to 100 meters with a frequency of 675 kHz. Sonar head 20 is electrically connected via a multi-wire cable 48 (FIG. 1) to a Mesotech Model 971 processor 50 in the control station 43 of FIG. 19, which also can house a Mesotech Model 971 monitor display unit 51 for viewing the processor output signals which provide target range and bearing information. In FIG. 4, this electrical cable 48 runs through the center of rope 21 and, although not specifically shown, is long enough to be connected to the various electrical components carried by fish 19A. Station 43 also can include a data storage means 52 for preserving these processor output signals which can later be used to generate the profiles of the scoured areas 17. Additionally, station 43 incorporates a control and viewing means 53 which is electrically connected with the tilt and pan mechanism on fish 19A, and further includes a current meter means 54 that is electrically connected with the fish flow meter 30 for reading out the river current velocity. A variable wing control means 55 is also electrically connected with devices in a second preferred fish embodiment 19B to be described later in connection with FIGS. 9 and 10.

Figure 17:
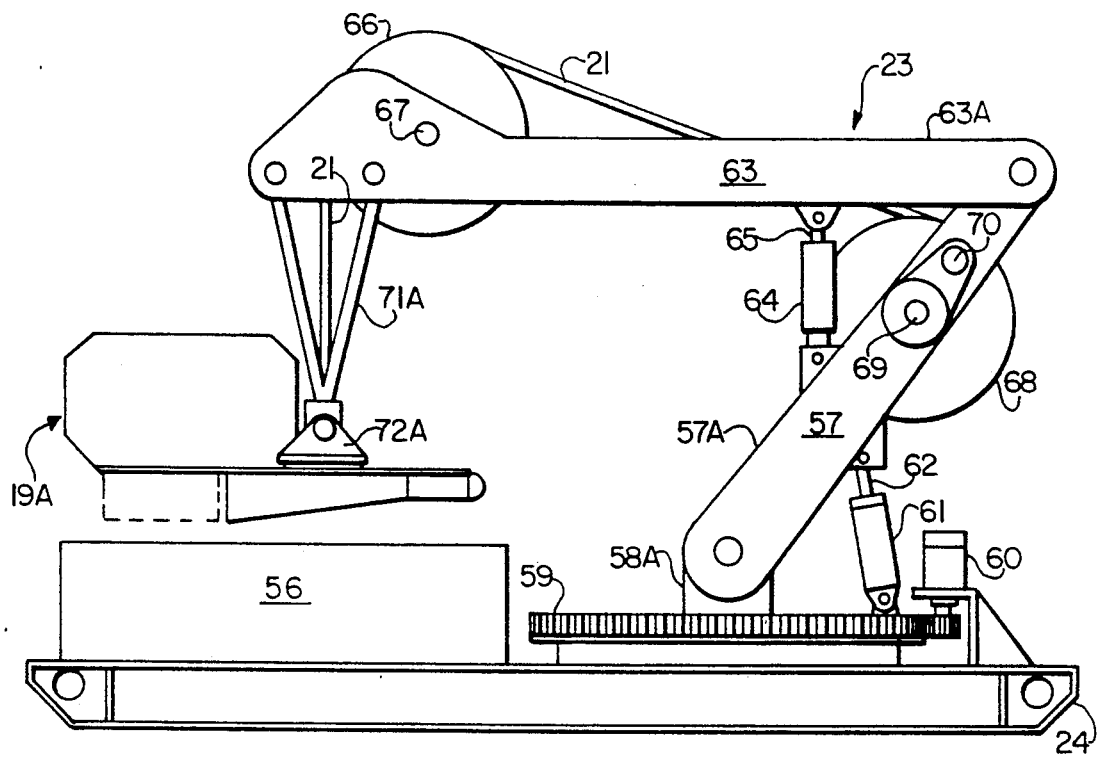
FIGS. 17 and 18 are side and end elevation views, respectively, of a preferred crane embodiment used to suspend the underwater sonar inspection equipment.
Figure 18:
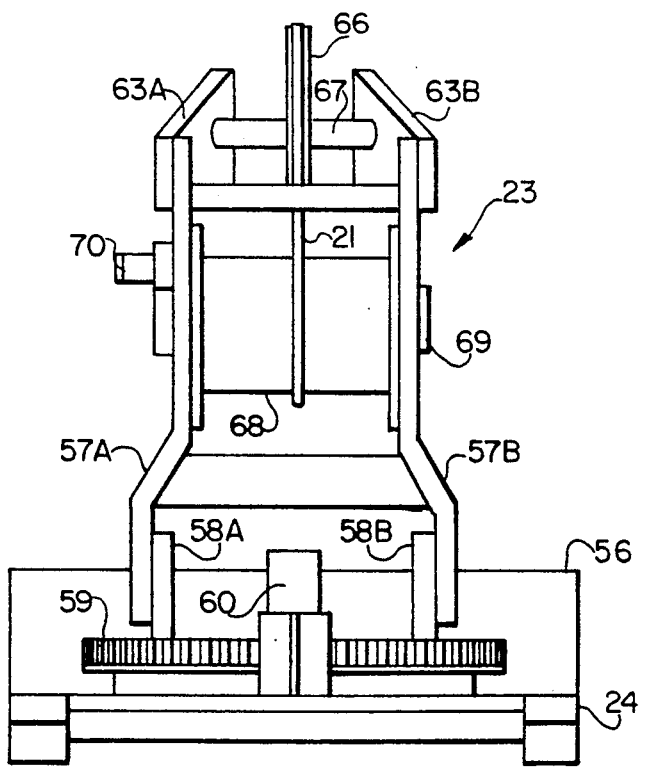

FIGS. 17 and 18 are side and end elevation views, respectively, of a crane apparatus 23 particularly suitable for storing and suspending the scour fish 19A of FIGS. 3-5 (and also scour fish 19B of FIGS. 9-10) in the practice of this invention. This crane 23 primarily comprises an articulated two-piece boom member which is mounted on a frame structure 24, shown here to consist of a skid which can be easily transported by a truck or rail to the bridge site. The skid 24 also supports a power package 56 which contains controls for operating the crane.

The lower crane boom member 57 is comprised of two spaced-apart elongated side members 57A and 57B whose bottom ends are respectively pivoted on upstanding ears 58A and 58B which are mounted on a horizontal and rotatable ring gear platform 59 carried by the skid 24. The platform 59 is changed in azimuth by a ring gear motor 60. A first hydraulic or air cylinder 61 and its associated piston 62 are connected between the ring gear platform 59 and one lower boom side member 57A for applying force to rotate the lower boom 57 in a counterclockwise direction about its pivot points on the ears 58 so as to raise this boom to a vertical position. The cylinder 61 and piston 62 also can be dimensioned to continue moving the boom 57 past the vertical to the other side of the ears 58 from the position shown in the FIG. 18.

The top ends of the lower boom side members 57A and 57B are respectively pivoted to the right ends (as shown in FIG. 18) of two spaced-apart side members 63A and 63B which comprise the upper crane boom member 63. A second hydraulic or air cylinder 64 and its associated piston 65 are connected between one lower boom side member 57A and one upper boom side member 63A for applying force to change the angle between said lower and upper booms 57 and 63 so that, for example, the upper boom 63 can be made horizontal when the lower boom 57 is pivoted to a new position. A total working horizontal boom length up to 20 feet appears to be feasible without unduly increasing the size, weight or expense of crane 23.

The reeving pulley 66 over which the fish support flexible line 21 passes is rotatably carried on a shaft 67 between the upper boom side members 63A and 63B near their left or free ends (as shown in FIG. 17). As is conventional with many reeving pulley systems, pulley 66 also can axially slide back and forth on shaft 67 as this pulley rotates when support line 21 is pulled across it. A powered winch drum 68 for storing, letting out and retrieving the support line is also affixed to a rotatable shaft 69 between the lower boom side members 57A and 57B near their upper ends, and this drum shaft 69 is rotated by a winch drive motor 70 carried on the outside of one of these side members 57A. When the winch drum is rotated in a clockwise direction (FIG. 17) to reel in the support rope 21, the reeving pulley 66 moves back and forth along its shaft 67 in order to evenly wind the support rope 21 across the entire surface of the winch drum 68. If the support line 21 also includes electrical cables within its hollow interior for communication with the fish, as described in connection with FIGS. 4 and 5, and also with FIGS. 9 and 10, these electrical cables may be unplugged from the remote station equipment when drum 68 is being rotated.

Finally, the left or free end of each upper boom side member 63A, 63B also is provided with a downwardly extending V-strut standoff support 71A and 71B (not shown), at whose bottom is attached a scour fish support pad 72A and 72B (not shown). These support pads 72 engage the upper body surface of the scour fish 19A (or 19B) when the support rope 21 is completely retrieved and tightened, and they help to prevent unwanted motion of the fish when the crane or its skid 24 is moved.

Although an articulated boom crane has been shown and described, other crane or boom configurations (such as telescopic booms) may also be used to deploy the scour fish.

The underwater orientation of the scour fish 19A is next described in connection with the FIG. 6 side elevation view of bridge piers 13A and 13B. This view also shows the fish suspended at its locations (A) and (D) Which, in practice, should preferably be about 11.5 feet below the water surface if conditions permit. All of the other fish underwater locations also preferably should be about 11.5' deep if possible. Because of its delta wing 25 and stabilizing fin 26 configuration, this fish remains in an extremely stable position and orientation when crane 23 lowers it by rope 21 into a swiftly moving water current of relatively constant velocity so that its bow end faces upstream. As shown in the left hand portion of FIG. 6, the fish's bow end at location (A) is depressed by the weight 28 and by the flow of water over the wing 25, so that the fish's longitudinal axis along wing 25 forms a dive angle 25a with respect to the horizontal. This dive angle is somewhat dependent on where the rope 21 is attached to the fin 26 through one of the holes 27. Angle 25a also is larger for a higher current velocity which, in turn, would cause the fish to be located further downstream from the pulley end of crane 23. Such an increase in the horizontal distance between the crane boom pulley 66 and fish 19A will also increase the angle 21a between rope 21 and the vertical. This relationship between river current speed and the size of angle 21a is shown by the upper solid line 93 in FIG. 13 which will be described later. However, the fin 26 stays upright so that the wing 25 is not banked to either side but remains generally horizontal except for the dive angle 25a given to it as previously described. The dashed outline of fish 19A in the right hand portion of FIG. 6 represents a subsequent suspended location (D) of the fish during the scour inspection procedure, during which time the fish is lowered by rope 21 from crane 23 which has been moved to the upstream side of the bridge.

Figure 6:
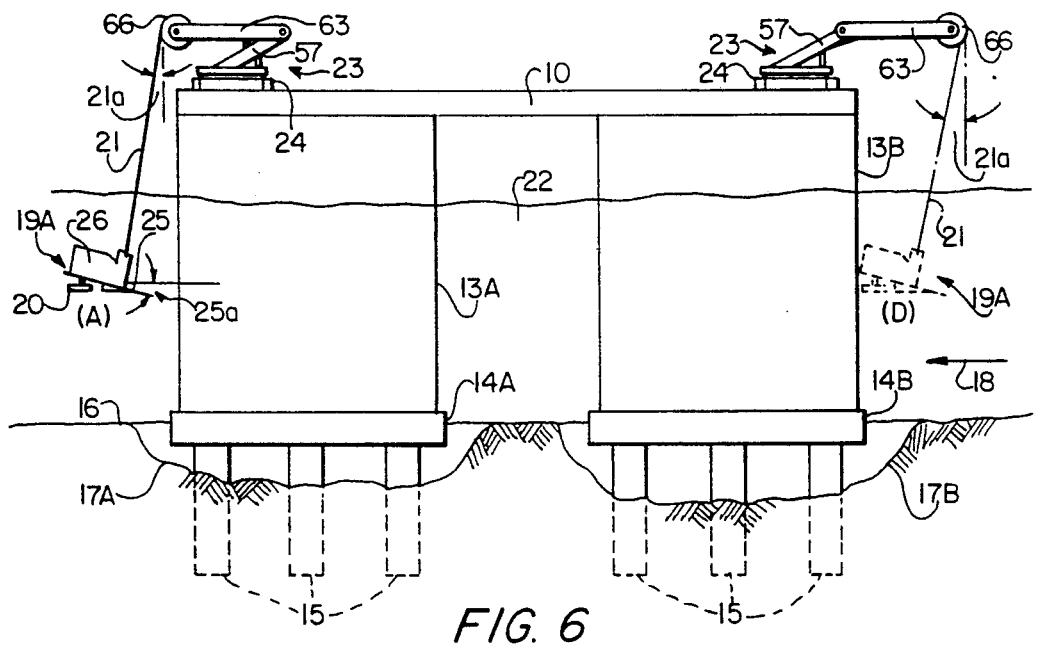
FIG. 6 is a side elevation view of the bridge piers which also shows the orientation of the underwater sonar inspection apparatus.

When the scour fish 19A assumes a stable dive angle 25a after being lowered into a moving current of water, the tilt motor 42 is operated by control means 53 via cable 48 from the remote control station 43 (FIG. 19) in order to rotate the tilt shaft 40 in a counterclockwise direction so as to return the platform 35 to a horizontal plane position as shown in FIG. 6. This also causes the sonar head rotating axis 46 to lie in a horizontal plane, notwithstanding the dive angle inclination of fish 19. The pan motor 37 may now be operated, via cable 48 from control means 53 in the remote control station 43, in order to rotate the sonar head axis to any desired azimuth direction. Conventional tilt angle and azimuth sensing means may be included in the tilt and pan mechanism 34 for allowing the remote station operator to view and control these parameters. For example, the mechanism 34 can be similar, if not identical to, a Model PTE pan and tilt device made by the Remote Ocean Systems company of San Diego, Calif.

Figure 7:
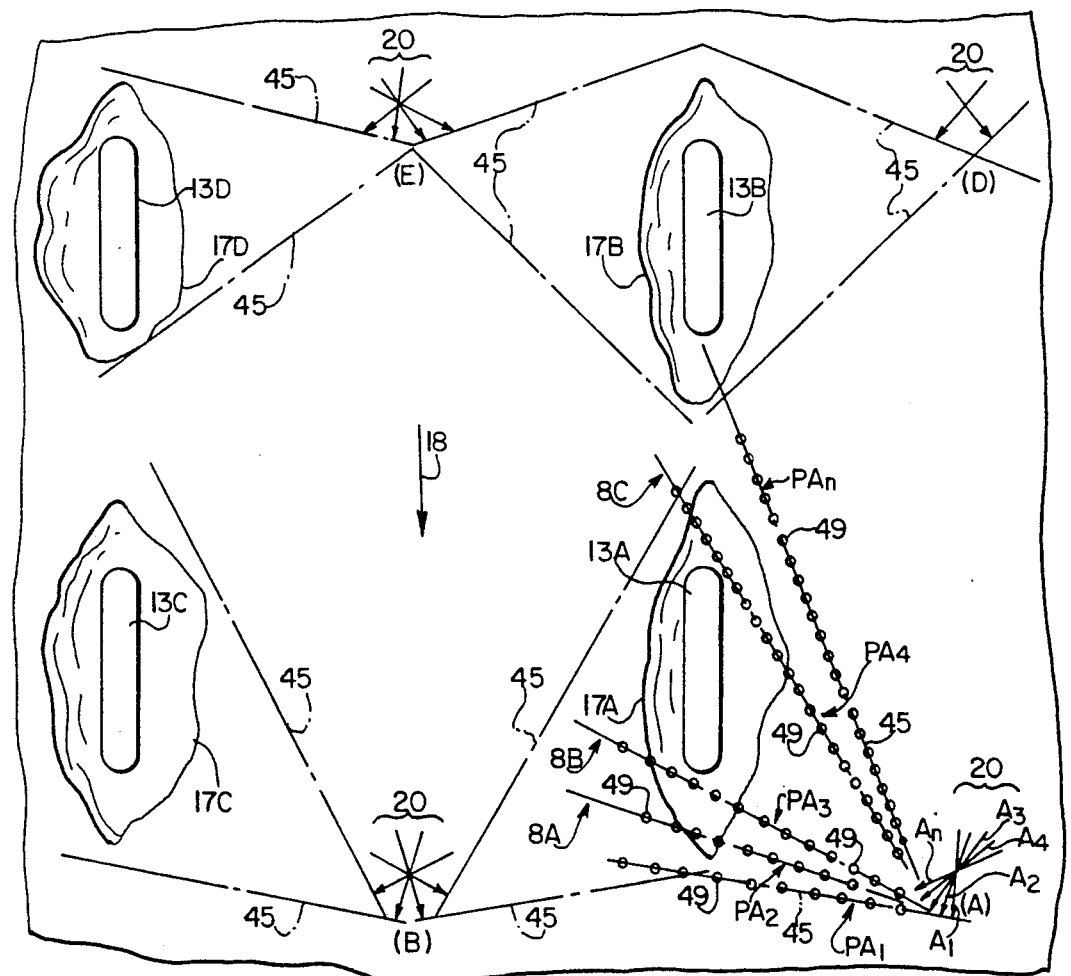
FIG. 7 is a diagrammatic plan view showing the scanning procedure using a sonar beam for the scoured areas around the bridge piers.

FIGS. 7 and 8 diagrammatically illustrate the sonar scanning method employed by the present invention in order to generate data which can be used to develop a profile of the scoured areas 17 around each pier of the bridge. FIG. 7 is a simplified, diagrammatic plan view showing each of the supporting piers 13, and a scoured area 17 around each of their footings 14 that needs to be examined during flood conditions.

Referring now to the lower right hand part of FIG. 7, it is assumed that the scour fish 19A (or 19B) has first been suspended in the water at location (A), as shown by its solid line position in FIGS. 1 and 2, so that it is to the right and downstream of the pier 13A. It then is necessary to ascertain more precisely where the fish and its sonar head 20 are located with respect to a fixed point or points of reference so that the sonar scour data can be correctly interpreted. The sonar head 20 itself can be used to determine how far away it is in a plan view from bridge structure, such as pier 13A, by scanning such structure in the fashion illustrated in FIG. 1 after platform 35 has been made horizontal and appropriately turned so that the transducer sonar beam can strike such structure. If necessary for this purpose, the transducer scanning sector angle also can be made larger (up to a 360° sweep) than is shown in FIG. 1. The vertical elevation of fish 19 (and its head 20), with reference to the bridge, can be determined by measuring the length of support rope 21 between crane pulley 66 and fish 19, and also measuring the value of the support rope angle 21a shown in FIG. 6.

After the fish becomes stabilized at location (A) and its platform 35 is made horizontal, this platform is now controlled from the remote station 43 (FIG. 19) in order to turn the sonar head 20 so that its axis 46 and transducer 33 point in an azimuth direction $A_1$, as shown in FIG. 7, in order to start scanning the scoured areas 17. The transducer 33 is also set to sweep or rotate around the horizontal sonar head axis 46 through a sector scan angle of sufficient magnitude to cause its conical beam 44 (represented by center line 45 in FIG. 7) to scan in a vertical plane $PA_1$ and impinge upon most, if not all, of that portion of the river bottom area which intersects or lies under said plane $PA_1$ within the beam's effective range and line of sight. For example, the vertical sector scanning sweep of the sonar head transducer 33 at location (A) may be on the order of 120° as illustrated in FIG. 1, although only part of this sector sweep is shown in FIGS. 7 and 8 for the sake of clarity. Vertical sweep plane $PA_1$ is perpendicular to the FIG. 7 plan view, and it also points in an azimuth direction from location (A) that is perpendicular to direction $A_1$. Each point of beam impingement on the river bottom is represented by a small circle 49. Although these circles 49 are spaced apart in FIG. 7 for the sake of clarity, in practice they generally overlap because the conical beam 44 expands in diameter as it travels away from transducer 33.

After the transducer 33 makes one or more sector scans in the vertical plane $PA_1$, the horizontal platform 35 is rotated a small amount in a clockwise direction so as to change the sonar head azimuth to a direction $A_2$ and cause the conical beam 44 to scan across another different portion of the scoured area 17A in a slightly different vertical plane $PA_2$ in FIG. 7. Plane $PA_2$ also points in another different azimuth direction from location (A) that is perpendicular to $A_2$. In practice, the platform 35 preferably should be rotated only one or two degrees at a time so that the bottom footprints 49 of the conical beam 44 will impact on most of the scoured area 17A within the beam's range and sight line. This is partially illustrated in the FIG. 7 plan view which shows only a few widely spaced different azimuth directions $A_1$, $A_2$, $A_3$, $A_4$, etc. for sonar head 20. The horizontal platform 35 with the sonar scanning head 20 is thus sequentially turned in small incremental steps until it finally reaches an azimuth direction $A_n$ where the conical beam 44 no longer detects any portions of the scoured bottom area 17A. Of course, platform 35 may be operated, if desired, to step through a total azimuth angle which is wider than the angle between the illustrated directions $A_1$ and $A_n$.

The elevation views in FIGS. 8A, 8B and 8C best illustrate the data conveyed to and processed at the control station 43 by the conical beam 44 as it scans the scoured area 17A around pier 13A. FIG. 8A is an elevation view taken perpendicular to the vertical scanning plane $PA_2$ in which the transducer conical beam 44 scans when sonar head 20 is at its azimuth heading $A_2$. As the sonar head axis and transducer 33 rotate, conical beam pulses are generated which successively produce the beam center lines 45 shown in FIG. 8A. Thus, the sonar beam 44 marches across and impinges upon that portion of the river bottom, including part of the scoured area 17A, which is in line with or intersects the vertical beam scanning plane $PA_2$. The reflected bottom return acoustic signal from each outgoing sonar conical beam pulse is detected by the transducer 33 and processed by means 50 at control station 43 to indicate on the control station monitor 51 the range and bearing of each bottom impact point 49 from the transducer for the particular scan angle occupied by the transducer at the time it generated the outgoing beam pulse. This information is also sent to the data storage device 52.

FIG. 8B illustrates the elevation profile of the portion of the river bottom and scoured area lying under a different conical beam vertical scanning plane $PA_3$ when the sonar head is pointed to azimuth direction $A_3$ by the rotatable platform 35 on scour fish 19. As shown in FIG. 7, this vertical scanning plane $PA_3$ intersects a different portion of the scoured area 17A. Sonar data regarding the width and depth of the scoured area 17A underneath this vertical scanning plane $PA_3$ is thus transmitted to the sonar processing and storage equipment at control station 43.

In similar fashion, FIG. 8C illustrates another elevation profile view of the river bottom, including a different portion of the scoured area 17A, when the sonar head is again changed in azimuth to point in direction $A_4$ so as to scan in a vertical plane $PA_4$ that points in an azimuth direction which is perpendicular to $A_4$. As indicated earlier, the transducer 33 rotates on the sonar head axis 46 and emits a conical beam pulse at different angular positions which strikes a portion of the river bottom and is reflected to provide information at station 43 indicating the range and bearing of that bottom portion from the transducer, as well as the transducer scan angle.

Thus, it will be seen that when the scour fish is at location (A), much of the scoured area 17A around the pier 13A can be profiled by sequentially scanning various different portions of the scoured area one after the other. The scoured part not profiled at this time will be the area behind the pier 13A which is not in a direct line of sight with the scanning sonar beam from location (A). Various portions of this remaining 17A area, however, can be sequentially scanned when the fish is later moved to the location (B) shown in FIG. 7. At location (B), the sonar head 20 also can be panned in azimuth to scan the right hand part of scoured area 17C around pier 13C. The remaining left hand part of area 17C will be scanned when the fish is subsequently moved to location (C), not shown in FIG. 7 but illustrated in FIGS. 1 and 2.

Identical sonar scanning procedures are followed when the fish is subsequently moved to locations (D), (E) and then (F). For the sake of clarity, FIG. 7 shows only a few of the azimuth scans by the sonar head 20 at each of the locations (D) and (E), but it should be understood that many more azimuth scans are performed in order to allow the sonar beam to impinge on most of the scoured areas 17B and 17D. If the sonar beam has sufficient range when scanning from its upstream locations (D), (E), etc., it can also impact on the upstream portions of the downstream scoured areas 17A and 17C in order to profile any of these areas that might remain hidden from the downstream scanning locations (A), (B), etc. In similar fashion, the sonar beam from its downstream locations (A), (B), etc., also may have sufficient range to sweep the downstream portions of the upstream scoured areas 17B, etc., as is represented by the extension of the beam center line 45 when sonar head 20 is pointed in the $A_n$ direction from location (A). The profiling of the left hand part of scoured area 17D will be done when fish 19 is at location (F) shown in FIGS. 1 and 2.

Thus, the bottom range and transducer scan angle information that appears on monitor 51 at station 43 is indicative of the scouring that occurs around the bridge piers during a flood condition. By observing the monitor display for each azimuth direction, the station operator in complete personal safety can make at least an initial determination regarding the extent and possible severity of such scouring so as to form an opinion regarding the present or future safety of the bridge. Furthermore, the stored data can later be used to generate elevation and plan map views of the scoured areas.

In FIG. 7, it also is important to note that the horizontal positions of the upstream locations (D), (E) and (F) preferably should be such that when the sonar transducer is totally facing downstream, the transducer face is on or upstream from a line tangent to the upstream ends of piers 13B and 13D. This is advantageous and desirable because the sonar beam then can sweep all of the upstream portions of scoured areas 17B and 17D that are adjacent to the pier upstream ends including the beginning portions of these scoured areas at points upstream from these piers. On the other hand, if scour fish locations (D), (E), and/or (F) were further downstream than as shown in FIG. 7, so that sonar head 20 is located to one side of piers 13B and/or 13D (or is even located downstream from the downstream ends of these piers), then some portions of these upstream scoured areas may be hidden by these piers from the sonar beam direct line of sight.

Figure 12:
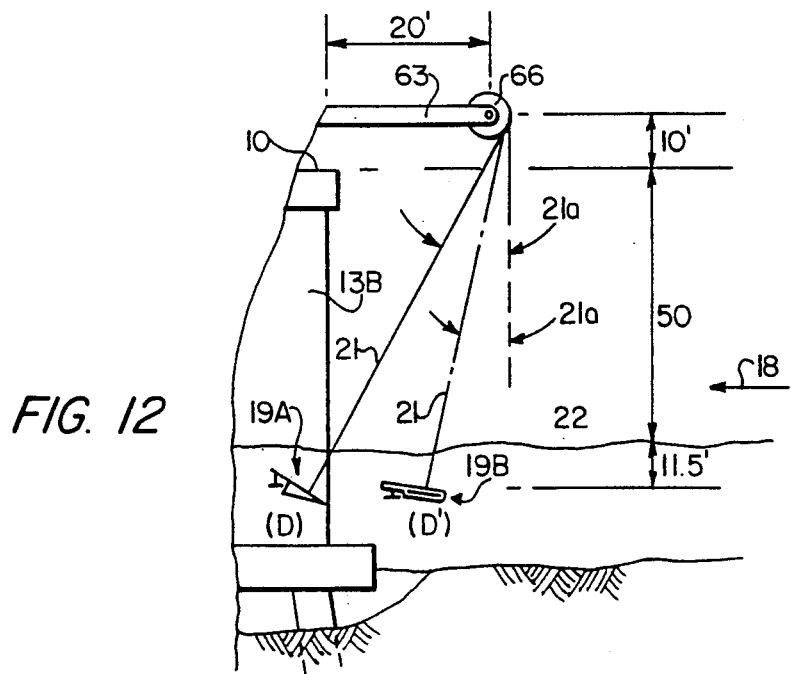
FIG. 12 is a side elevation view showing how the first and second scour fish embodiments behave in similar surroundings.

As is illustrated in the right hand portion of FIG. 6, the fixed wing scour fish 19A of FIGS. 3-5 is assumed to be lowered by support rope 21 from a crane boom of some maximum effective length (e.g., 20 feet) to a location (D) which is completely upstream from pier 13B when the bridge road bed 10 is not so high above the water's surface as to require an extremely long support rope 21, and when the river current velocity is not so large as to substantially increase the rope angle 21a. However, FIG. 12 illustrates another upstream location (D) of this fixed wing fish 19A when a much longer support rope 21 is needed because the bridge roadbed 10 is quite high above the water's surface, and/or when the river flood current 18 is at or near maximum flood velocities up to 15 knots so that the fish 19A is pushed farther downstream to thereby increase the rope angle 21a to a fairly large value. For these conditions, the fixed wing fish location (D) in FIG. 12 may undesirably be to one side of a bridge pier 13B rather than being entirely upstream therefrom, unless the crane boom can be extended beyond its presently assumed maximum practical horizontal length of about 20 feet.

Figure 13:
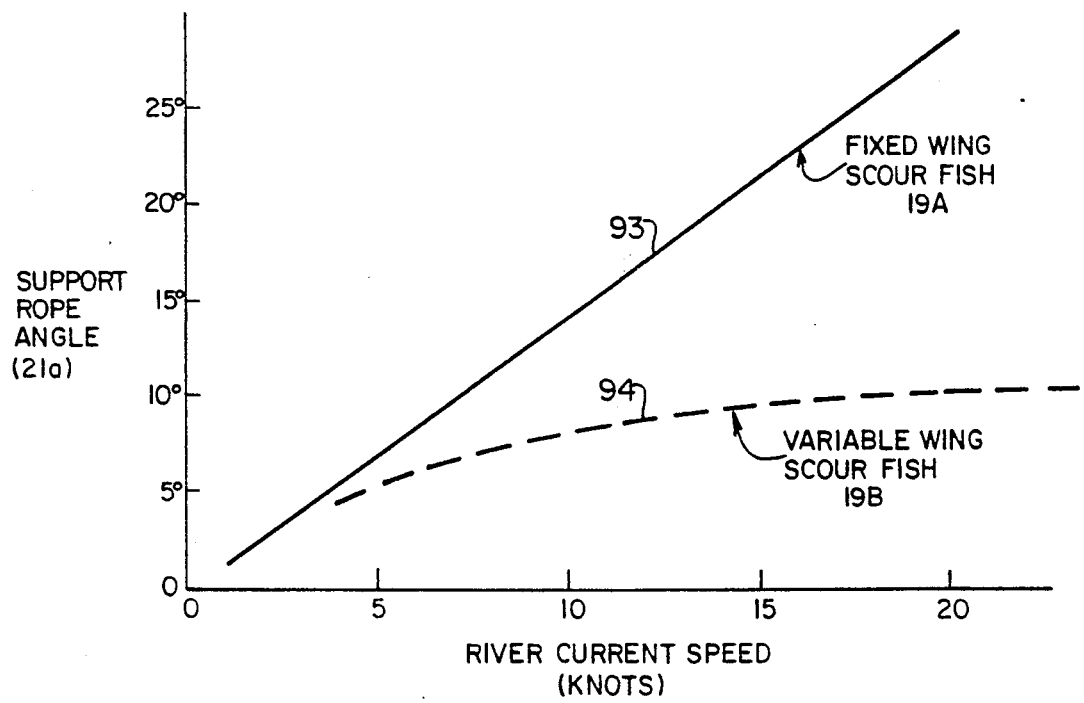
FIGS. 13, 14, 15, and 16 are charts illustrating certain operating characteristics of one or both of the first and second scour fish embodiments.

In FIG. 12 (not to scale), for example, assume (1) that the crane boom is at its maximum horizontal extension of 20 feet from the upstream end of pier 13B, (2) that the height of the boom reeving pulley 66 above the bridge roadbed 10 is about 10 feet, (3) that the height of the bridge roadbed 10 above the flood water surface 22 is about 50 feet, (4) that the fixed wing fish 19A is located about 11.5 feet under the water's surface, and (5) that the flood river current speed is about 15 knots so that the rope angle 21a for the fixed wing fish 19A is assumed to be about 22° as shown by solid line 93 in FIG. 13. Under these conditions, the horizontal downstream distance of location (D) from the pulley end of the crane boom can be approximately calculated by multiplying the vertical distance between the boom pulley 66 and fish 19A (i.e., 10 feet + 50 feet + 11.5 feet = 71.5 feet) by the tangent of 22°. This calculation results in a horizontal downstream distance of about 29 feet from the boom pulley 66 to the fish 19A, thus putting the fish location (D) about 9 feet downstream from the upstream end of the pier 13B. This downstream position of location (D) might well prevent sufficient sonar scanning of the scoured area adjacent to the upstream end of the pier.

Figure 9:
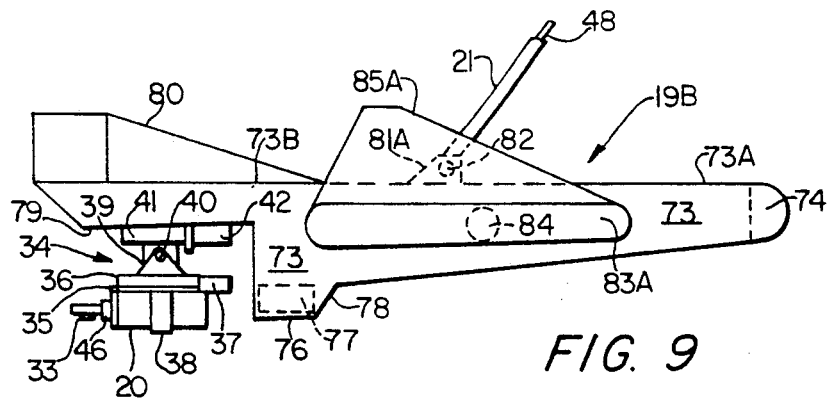
FIGS. 9 and 10 are elevation and plan views, respectively, of a second preferred embodiment of a scour fish apparatus.
Figure 10:
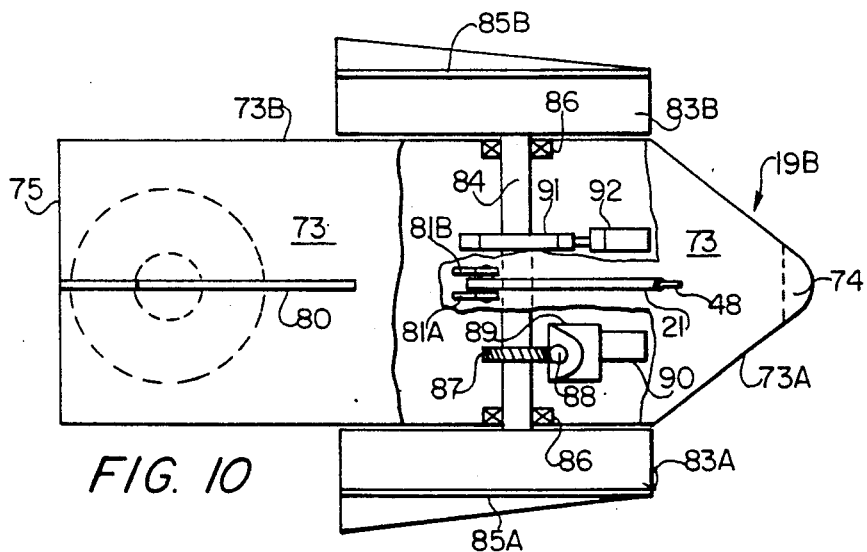

Accordingly, FIGS. 9 and 10 illustrate a second preferred embodiment 19B of a scour fish which is more technically complex than the scour fish 19A of FIGS. 3-5 but which can be used under all operating conditions of bridge heights and current velocities that are expected to be encountered. As shown in the FIG. 9 elevation view and the FIG. 10 plan view, this second scour fish embodiment 19B has a hollow body 73 which includes a laterally extending rounded nose or bow section 73A (in plan view) which contains a weight 74 at its forward end. In the FIG. 10 plan view, a second body section 73B of constant width extends rearwardly from its nose section 73A, terminating in a squared stern end. The FIG. 9 elevation view shows the fish body 73 to be slightly tapered downwardly from its nose section 73A to a flow meter compartment 76 which contains a flow meter 77. A window 78 in the body 73 permits water to enter this compartment 76 for measurement of current velocity by the flow meter 77. The body section 73B back of compartment 76 is stepped upward and then rearward, as shown in FIG. 9, to provide a bottom aft surface 79 on which is mounted a tilt and pan mechanism 34 with sonar head 20 and transducer 33, all of which are identical in design and operation to the correspondingly numbered components on the first scour fish embodiment 19A of FIGS. 3-5. The scour fish body 73 in FIGS. 9-10 has slightly curved top and bottom surfaces, while its side surfaces also are curved.

A thin, vertical center fin member 80 is mounted on the longitudinal center line of the rear part of the body top surface for also stabilizing the fish 19B. A bracket with two upstanding ears 81A and 81B is also secured on this center line of the body top surface at a forward location from the fin 80. A pin 82 through the ears of this bracket is used to secure a braided support rope 21 having a hollow center, through which passes the multi-wire electrical cable 48 from station 43 for communication with the various electrical components carried by the fish 19B.

A pair of laterally extending trapezoidal (in plan view) and rotatable hollow wing members 83A and 83B also are fixedly attached to the ends of a transverse shaft 84 which laterally extends through the fish body 73, one wing member being on each side of said body. Each wing structure in elevation is thicker than the diameter of shaft 84 and has rounded leading and trailing edges. A stabilizing thin vertical side fin member 85A or 85B is also mounted on the upper surface of each wing near the wing's outer edge. Each side fin 85 is generally triangular in shape with its apex located closer to the wing's trailing edge than to its leading edge.

As shown by the broken-out section plan view of FIG. 10, shaft 84 is rotatably held by bearings 86 in the body side surfaces and is fitted with a bull gear 87. This bull gear 87 engages a worm gear 88 which, in turn, is operably connected through a conventional gear box 89 with an electric motor 90. The operation of motor 90 by the remote station 43 operator will thus revolve shaft 84 and rotate the wings 83. In order to securely fix shaft 84 at a particular rotational angle for preventing creep and undue stress on its motor gear train, a band type brake means 91 is mounted on the shaft and operated by the electric brake control means 92 that can be activated by the remote station operator. The variable wing control means 55 at station 43 (FIG. 19) may include conventional motor controls.

By rotating these wing members 83 about the axis of shaft 84, the dive angle of the fish body 73 can be varied for any given velocity of water current that is likely to be present during flood conditions. Variation of this dive angle will change the amount of horizontal force that is applied by the current to the scour fish 19B, e.g., the smaller the dive angle, the smaller will be this force. In turn, the magnitude of this horizontal moving water force will determine how far the fish is horizontally moved by the current downstream from the end of the crane boom and, accordingly, what size angle 21a is formed between the support rope 21 and the vertical. The remote station operator adjusts wings 83 until he observes that a minimum angle 21a has been achieved.

Figure 15:
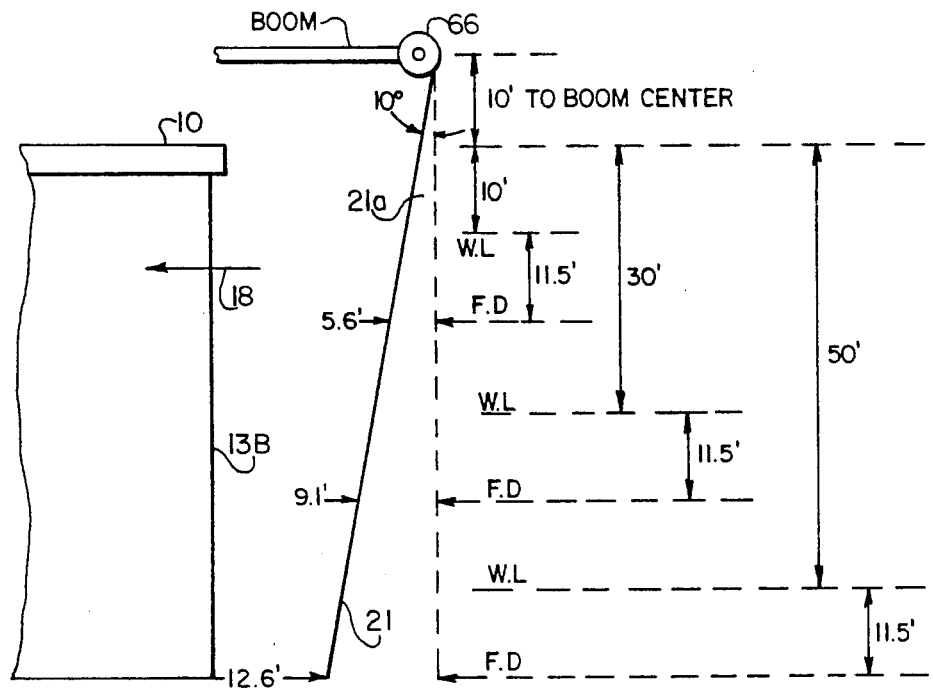

Referring again to FIG. 13, the dashed line 94 represents the value of the support rope angle 21a for any given current speed to which the variable wing scour fish 19B is exposed when its wings 83 are appropriately adjusted to minimize its dive angle at that speed. These angles 21a for the variable wing fish 19B are considerably smaller than the angles 21a for the fixed wing fish 19A as the current speed increases. For example, at 15 knots the fixed wing support rope angle 21a may be 22°, the support rope angle 21a may only be about 10° for the variable wing fish if both fish embodiments are of comparable size (e.g., with about a 48" wing span). FIG. 12 also diagrammatically shows how this difference in support rope angle values will allow the variable wing fish 19B to occupy a location (D') which is totally upstream from pier 13B so as to insure complete sonar beam scanning of the scoured area around the upstream edge of this pier. If the same hypothetical values for boom height (10'), bridge height (50') and fish depth (11.5') are used for the variable wing fish 19B as were used in the preceding fixed wing fish example, the smaller 10° support angle 21a results in fish 19B being horizontally located at (D'), which is only about 12.6' downstream from the boom pulley 66 as compared with the 29' downstream distance of location (D) for the fixed wing fish 19A. FIG. 15 also shows how a support angle 21a of 10° results in different horizontal downstream distances from boom pulley 66 of the variable wing fish 19B for different values of bridge height above the water line (W.L.), e.g., 10 feet, 30 feet and 50 feet, when the fish depth (F.D.) is held at about 11.5'.

Figure 14:
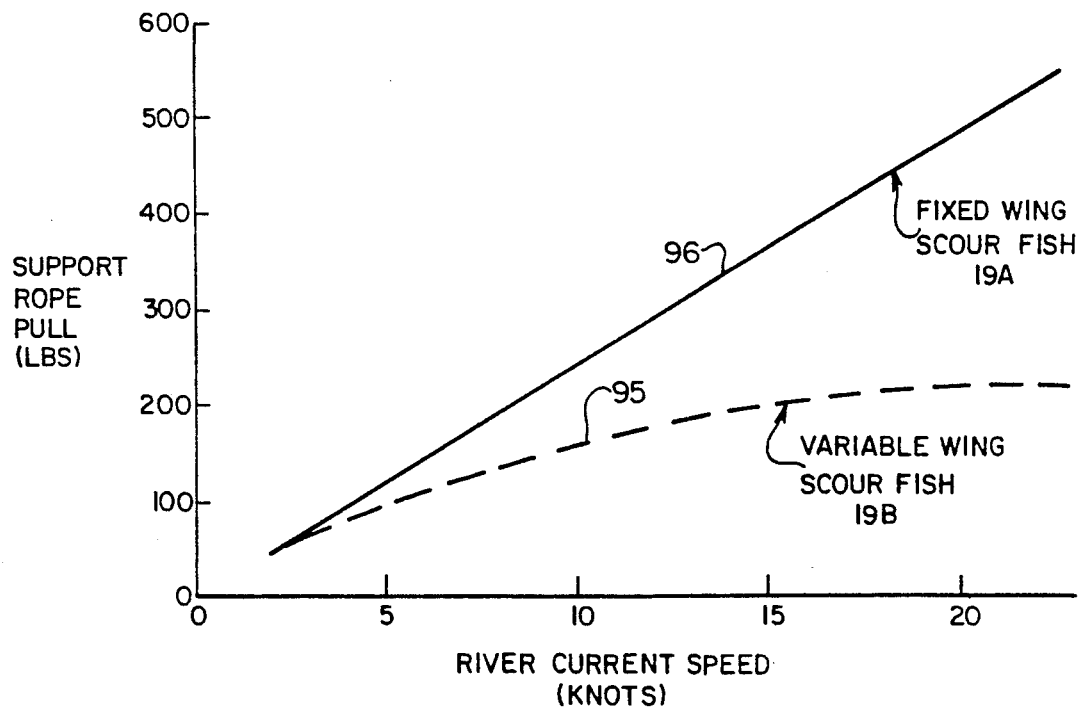
Figure 16:
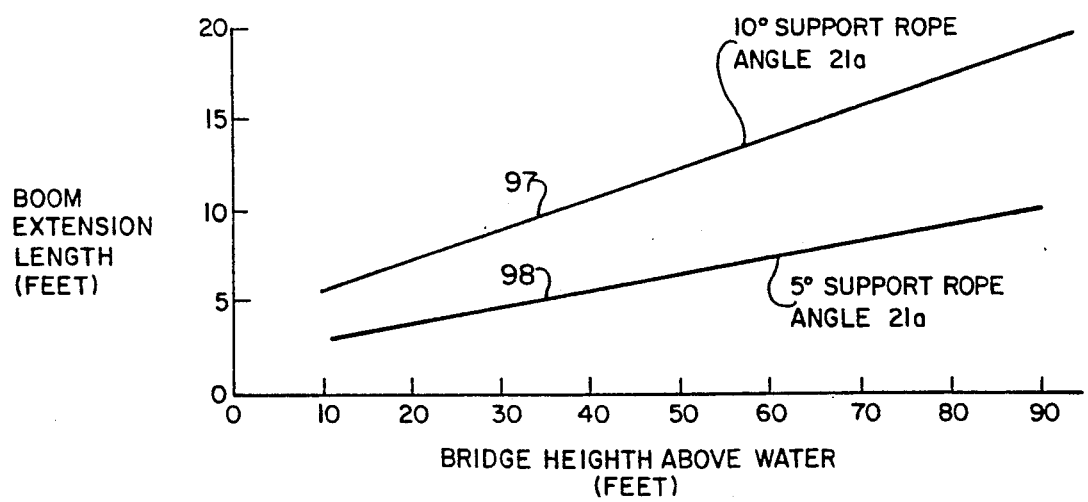

Another advantage of the variable wing fish 19B over the fixed wing fish 19A is shown by FIG. 14. For any given river current velocity, the pull or tension on support rope 21 is less for the variable wing fish 19B than for the fixed wing fish 19A, as shown by the lines 95 and 96. This lesser pull permits a thinner and cheaper support rope to be used for the variable wing fish 19B, or otherwise permits a longer life cycle for a variable fish's support rope of the same size. Furthermore, line 97 in FIG. 16 shows that when the upstream rope angle 21a is limited to a maximum value of about 10°, the crane boom length need not exceed 20' for complete upstream sonar coverage, even for a bridge which is 90' above the water surface (assuming a boom height of 10' and a fish depth of 11.5'). Of course, a lesser support rope angle of 5° (see line 98 in FIG. 16) will even more reduce the need for an extremely long and costly boom when conducting upstream scour surveys.

FIG. 11 shows a different apparatus body for mounting and positioning the sonar scanning head 20 used in the practice of this invention. The tilt and panning mechanism 34 of FIGS. 3-5, which holds the sonar scanning head 20 and transducer 33, is also employed in FIG. 11 but is not attached to a scour fish device. Instead, the mechanism 34 is secured to the underside of a thin vertical fin 99 whose upstream vertical edge faces the current flow 18. Small laterally extending small delta-shaped wing structure 101A or 101B horizontally projects from each side of fin 99 near its downstream vertical edge 102 in order to provide additional resistance to banking. The plan view shape of these delta wings 101 is shown in FIG. 11A. The upstream vertical edge 100 of fin 99 is attached by upper and lower ring couplers 103A and 103B to a vertical line 104 whose lower end is connected to a bullet or clump weight 105. This weight 105 is dropped over the side of the bridge above any one of the underwater locations (A)–(F) in FIG. 2 and pulls line 104 down until the weight strikes bottom. With the line 104 held taut by weight 105 and tension on the line 104 from above, the fin 99 with its attached sonar apparatus is then lowered to a position (A)–(F) along the line 104 by a combined support rope 106-electrical control cable 48 that is attached to the fin 99. The fin 99 is aligned with the current direction 18 and remains stable in this position while the sonar head 20 scans the scoured bottom areas 17 in the manner previously described in connection with FIGS. 7 and 8. While not specifically shown in FIG. 11, control cable 48 continues along fin 99 and reaches mechanism 34 and sonar head 20 for establishing communication with remote station 43. Alternatively, fin 99 can be attached to a support rope 21, as in FIGS. 4 and 9, where electrical cable 48 runs through the center of rope 21.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

What is claimed is:

1. A method of determining the nature of a second underwater bottom area adjacent to a structure submerged in a current of rapidly moving water during a flood condition, said method comprising the steps of:
   (a) temporarily supporting sonar beam transducer means at least at a first underwater location within sonar beam range of said scoured area;
   (b) scanning a first portion of said scoured area with a sonar beam from said first underwater location by sweeping said sonar beam through an angle in a first substantially vertical scan plane that points in a first azimuth direction from said first underwater location, so as to generate signals indicative of the range and bearing of said scanned first portion from said transducer means at said first underwater location; and
   (c) scanning at least a second different portion of said scoured area with a sonar beam from said first underwater location by sweeping said sonar beam through an angle in a second different substantially vertical scan plane that points in a second different azimuth direction from said first underwater location, so as to generate signals indicative of the range and bearing of said scanned second portion from said transducer means at said first underwater location.

2. Apparatus for determining the nature of a scoured underwater bottom area adjacent to a structure submerged in a current of water, said apparatus comprising:
   (a) sonar beam transducer means;
   (b) means for temporarily supporting said transducer means at an underwater location within sonar beam range of said scoured area;
   (c) means for causing said transducer means to scan a first portion of said scoured area with a sonar beam which sweeps through an angle in a first substantially vertical scan plane that points in a first azimuth direction from said underwater location;
   (d) means for causing said transducer means to scan at least a second different portion of said scoured area with a sonar beam which sweeps through an angle in a second different substantially vertical scan plane that points in a second different azimuth direction from said underwater location; and
   (e) means responsive to the sonar beam reflections from said first and second scanned area portions to generate signals indicative of the ranges and bearings of said portions from said transducer means.

3. The method of claim 1, wherein the sonar beam is conical in shape.

4. The method of claim 1, in which said first and second scoured area portions are sequentially scanned one after the other.

5. The method of claim 1, in which various different portions of said scoured area are sequentially scanned one after the other by the same sonar beam from said first underwater location, and wherein said first location scan of each said portion is in a different substantially vertical scan plane that points in a different azimuth direction from said first location and which is less than ten degrees apart from the azimuth direction of an adjacent substantially vertical scan plane.

6. The method of claim 5, wherein the sonar beam is conical in shape.

7. The method of claim 1, which further comprises the steps of temporarily supporting sonar beam transducer means at least at a second different underwater location within sonar beam range of said scoured area and scanning various different portions of said scoured area with a sonar beam from said second underwater location so as to generate signals indicative of the ranges and bearings of said portions from said transducer means at said second location, wherein said second location scan of each said portion is performed by sweeping said sonar beam through an angle in a different substantially vertical scan plane that points in a different azimuth direction from said second underwater location.

8. The method of claim 7, wherein the same sonar beam transducer means that is supported at said first underwater location for scanning scoured area portions therefrom is subsequently moved to and supported at said second underwater location for scanning scoured area portions therefrom.

9. The method of claim 8, wherein said sonar beam is conical in shape.

10. The method of claim 5, which further comprises the steps of temporarily supporting sonar beam transducer means at least at a second different underwater location within sonar beam range of said scoured area and sequentially scanning various different portions of said scoured area with a sonar beam from said second underwater location so as to generate signals indicative of the ranges and bearings of said portions from said transducer means at said second location, wherein said second location scan of each said portion is performed by sweeping said sonar beam through an angle in a different substantially vertical scan plane that points in a different azimuth direction from said second location and which is less than ten degrees apart from the azimuth direction of an adjacent substantially vertical scan plane.

11. The method of claim 1, in which said first underwater location is upstream from said structure.

12. The method of claim 1, wherein said transducer means is supported by a body that is spaced apart from said structure and which is suspended underwater by flexible line means attached to means above the water surface.

13. The method of claim 12, wherein an angle is formed between said flexible line means and the vertical which is not greater than about ten degrees.

14. A method of determining the nature of a scoured underwater bottom area adjacent to a structure submerged in a current of rapidly moving water during a flood condition, said method comprising the steps of:
(a) temporarily supporting sonar beam transducer means at an underwater location upstream from said structure and within sonar beam range of said scoured area, wherein said transducer means is supported by a body that is spaced apart from said structure and which is suspended underwater by flexible line means attached to means above the water surface so that an angle is formed between said flexible line means and the vertical which is not greater than about ten degrees; and
(b) scanning at least the beginning portion of said scoured area upstream from said structure with a sonar beam from said underwater location, so as to generate signals indicative of the range and bearing of said scanned beginning portion from said transducer means at said underwater location.

15. The apparatus of claim 2, wherein said transducer means generates a sonar beam which is conical in shape.

16. The apparatus of claim 2, wherein said transducer support means comprises a body which is suspended underwater by means located above the water surface, said body including laterally extending delta-shaped structure that tapers inwardly toward an end of said body which faces upstream in said current of water.

17. The apparatus of claim 16, wherein said body further includes laterally extending variable wing structure which is rotatable about an axis laterally extending through said body.

18. The apparatus of claim 16, wherein said sonar beam transducer means includes a rotating transducer shaft, and said body is provided with tilt-and-pan means to which said sonar beam transducer means is secured for making said transducer shaft lie in a generally horizontal plane and for changing the azimuth direction of said transducer shaft.

19. The apparatus of claim 18, wherein said transducer means generates a sonar beam which is conical in shape.

20. The apparatus of claim 18, wherein said body further includes laterally extending variable wing structure which is rotatable about an axis laterally extending through said body.

* * * * *